Patented Jan. 18, 1927.

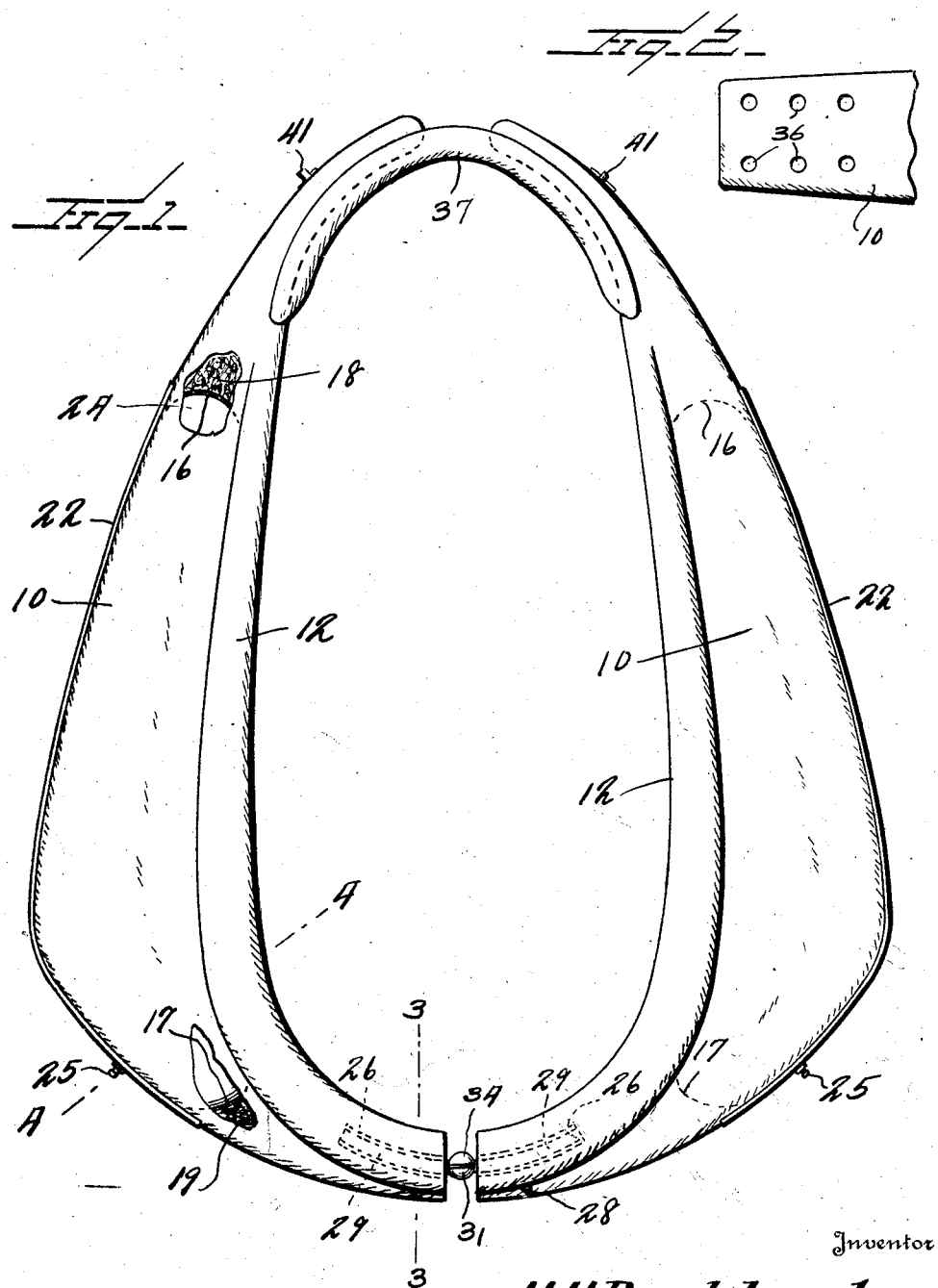

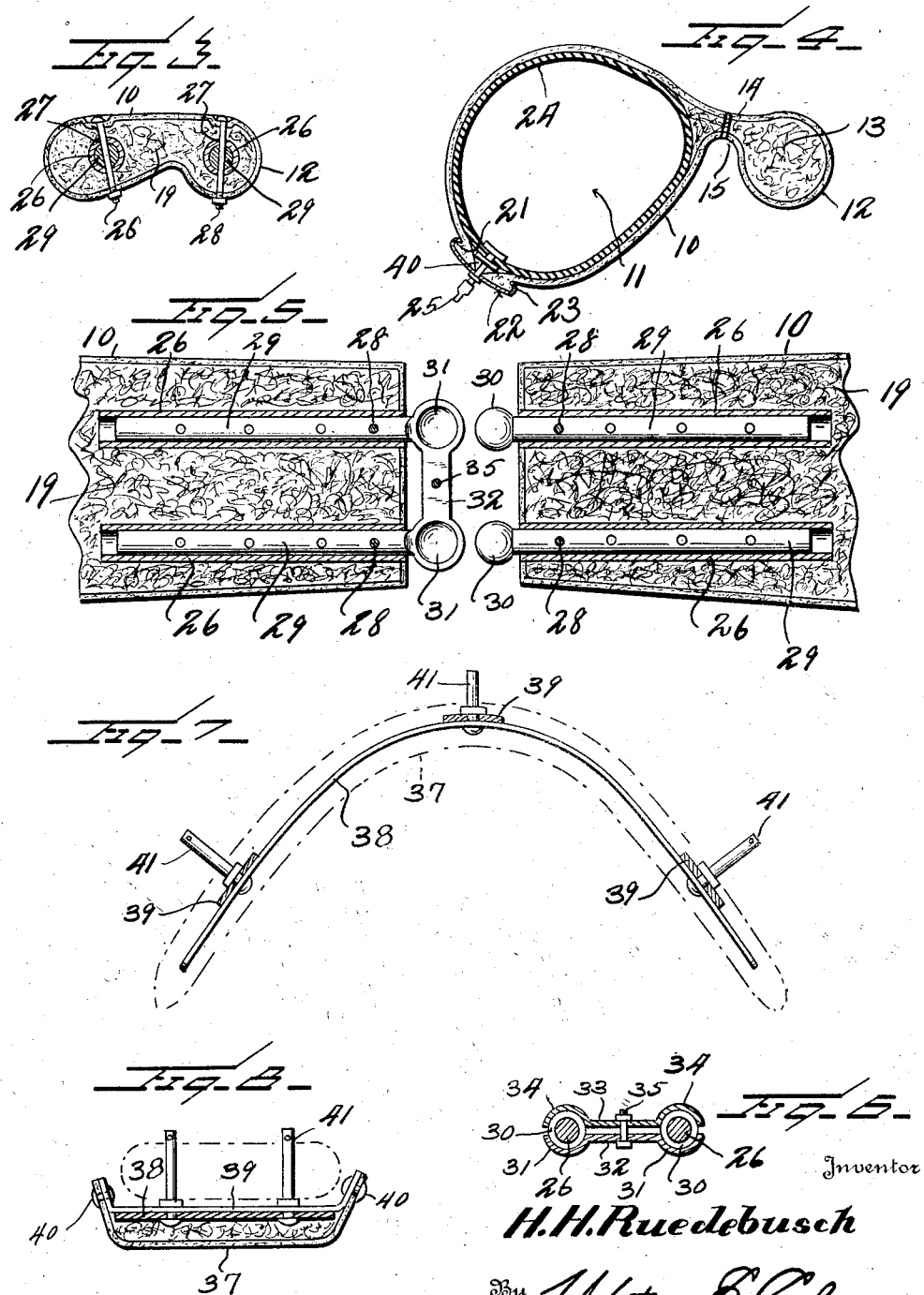

1,614,994

UNITED STATES PATENT OFFICE.

HERMAN H. RUEDEBUSCH, OF ELKTON, SOUTH DAKOTA.

ADJUSTABLE PNEUMATIC HORSE COLLAR.

Application filed March 18, 1926. Serial No. 95,734.

This invention relates to horse collars and particularly to pneumatic horse collars.

One of the general objects of this invention is to provide a pneumatic horse collar of this character made of material that will wear well and which will not harden under usage or from sweat or rain, as will the average leather collar.

A further object is to provide a construction of this kind having a supporting frame, a casing of rubberized or vulcanized canvas or the like, and an inner inflatable tube.

A still further object is to provide a collar of this character which by reason of the inflatable tube, may be readily made to fit properly upon the horse's neck and it is further so constructed that it may be adjusted to various sizes.

Another object is to provide means for holding the outer casing closed upon the inner tube which will eliminate the use of stitching or lacing which stitching and lacing often rips or breaks.

Still another object is to form the lower portions of the two sections of the collar of canvas or like material having a solid filler therein thus making the collar very strong and durable at its lower end where most collars break.

Another object is to form the collar of two sections adjustable toward or from each other at their lower ends and including members acting as hinges for the two sections so that the collar will not be liable to break at the lower end which ordinary collars often do, due to the bending of the collar to open it in order to put it on or take it off the horse's neck.

Another object is to provide a spring neck-piece so that the collar taken as a whole may be adjusted up or down and adjusted at the bottom, the spring neck-piece making it adjustable in or out so as to provide a collar which will fit properly all around the horse's neck and do away with the expense of a sweat-pad, which sweat-pad, is liable to get wet and harden.

Other objects will appear in the course of the following description.

My invention is illustrated in the accompanying drawings wherein:—

Figure 1 is a face view of a horse collar constructed in accordance with my invention;

Fig. 2 is a fragmentary plan view of the upper end of one of the sections of the collar;

Fig. 3 is a section on the line 3—3 of Figure 1;

Fig. 4 is a section on the line 4—4 of Figure 1;

Fig. 5 is a fragmentary horizontal section through the lower end of the collar but showing the two halves of the collar;

Fig. 6 is a transverse vertical section through the ball and socket joint connecting the lower ends of the collar;

Fig. 7 is a vertical sectional view through the spring pad;

Fig. 8 is a transverse section on the line 8—8 of Figure 7.

From Figure 1 it will be seen that my improved collar is formed of two sections. Each of these sections is alike, therefore description of one section will apply to the other. Each section consists of an outer casing 10 of canvas, preferably rubberized or vulcanized canvas or like material, this outer casing tapering toward its upper end and becoming gradually smaller toward its lower end and having the form approximately of a semi-ellipse. This casing as illustrated in Figure 4 in cross section is so formed as to provide at its middle a relatively large hollow chamber 11 and a relatively small tubular portion 12 which is filled with a core 13 of any suitable material. The walls of the casing are brought together or approximated as at 14, the walls of the casing being preferably sewed or cemented together at this point so as to provide a longitudinally extending hame seat 15.

The chamber 11 is closed at its top and bottom by walls 16 and 17 and above the wall 16 the casing is filled with relatively solid material 18. Below the wall 17 the casing is also filled with relatively solid material designated 19. The outer wall of the casing has a longitudinally extending opening and the material on each side of this opening is formed with longitudinally extending beads 21 substantially like the beads on a clincher tire. These beads are adapted to be engaged by a longitudinally extending rim 22 which is slightly curved transversely and is formed to fit the collar and has inwardly turned flanges 23 adapted to engage the clincher beads 21. This rim 22 has an opening for the inflating valve stem of an inner tube 24. This inner tube is made of thin rubber of practically the same character as the inner tube of a pneumatic tire and this inner tube is disposed within the chamber 11 and carries the usual inflating valve designated generally 25. The stem of this valve extends out through the rim 22 and is provided with the usual inflating valve cap. Inasmuch as this inflating valve is of an ordinary character I do not think it necessary to illustrate or describe it further. It is, of course, to be engaged by an air pump or other inflating device so that air may be pumped into the inner tube to cause the inflation of the same.

The lower end of one section of the collar is provided with a pair of slightly curved tubes 26 preferably of metal, these tubes being embedded in the filling 19 and having openings 27 to permit bolts 28 to be inserted through the lower portion of the collar and the filling and through these tubes. Disposed in each one of these tubes is a slidable rod 29 having holes adapted to align with the openings 27 so that these rods may be shifted inward or outward and then held in their adjusted positions by the bolts 28. Each of these rods 29 at its outer end is provided with a globular head 30. The opposite section of the collar is also provided with the tubular members 26 and with telescopic rods 29, the tubular members being provided with the apertures 27 and bolts 28 being used for holding these rods 29 in a projected or retracted position but the extremities of these rods are provided with half sockets 31 connected by a transverse bar 32. These half sockets are adapted to receive the heads 30 and coacting with the half sockets is a transverse bar 33 having half sockets 34 at its extremities and adapted to be disposed over the half sockets 31 and almost enclose the globular heads 30. Thus a ball and socket joint is formed between the two sections of the collar at the lower ends of the sections.

The cross bar 33 is held to the cross bar 32 by means of a bolt 35 and it is obvious that by removing this bolt 35 the two sections of the ball and socket joint may be opened to permit the withdrawal of the bolts 30 and that these connecting members between the two sections of the collar may be adjusted inward or outward to thus adjust the width of the collar at its lower end. The upper ends of the two sections of the collar as illustrated in Figure 2 are formed with a plurality of longitudinal series of perforations 36 and adapted to be disposed inward of the two upper ends of the sections of the collar is a neck-piece consisting of an inner layer of padding 37 and an arcuate leaf spring 38 disposed outward of the padding. The padding extends beyond the ends of the leaf spring 38 and is turned upward and outward so as to cover the extremities of the spring and the side margins of the padding are connected to three metallic cross members 39 by rivets 40. Passing through the spring 38 and through each cross bar 39 are a plurality of pins 41 having slots at their extremities. There are two pins to each of the cross bars 39 and these pins are adapted to be inserted through any one of the holes 36. Keys can be put through the slots in the extremities of the pegs or pins 41 for the purpose of holding the neck-piece to the collar, it being understood that the holes 36 permit the extremities of the collar to be hooked over these pegs in the neck-piece.

The ordinary neck-piece bear mostly, on big horses at the bottom of the neck-piece on both sides whereas my improved neck-piece, being made with the spring 38, may be made to fit any size horse either small or large inasmuch as it may be readily forced inward by taking up or letting out the hames strap at the top of the hames. This neck-piece will always crowd out against the inner walls of the collar and thus will make a smooth surface from the collar to the neck-piece. The common neck-piece used ordinarily will not crowd out to the inner walls of the collar as a rule. They are ordinarily too small and too narrow for a large horse and when the neck-piece is small and there are no means for crowding it outward it crowds or pinches the horse's neck, causing sores to form. When the usual neck-piece is used on a large horse it leaves a space of between ½" and ¾" between the bottom of the neck-piece and the inner wall of the collar. My improved self adjusted neck-piece will fit itself to any size neck or collar.

By providing a collar of the character described formed in two sections and adjustable toward or from each other at their lower ends, I provide a collar that can be made either wider or narrower according to the different conditions of the horse. The ordinary horse collar, which is adjustable at the top only, never can be properly adjusted so as to fit properly under all circumstances. By providing an adjustment at the top of the collar and an adjustment at the lower end of the collar and providing the pneumatic tube I secure a three-size collar which is adjustable up or down and adjustable either at its top or its bottom, thus doing away with the expense of a sweat-pad and the consequent disadvantages thereof.

The collar which I have described and illustrated is made of material which will wear well and not harden under working conditions. It is strong in construction, durable and light in weight and by having the rim 22, the casing forming the bottom of the collar may be readily opened or closed and thus permit the easy removal or insertion of the inner tube. The valve stem of the inner tube provides an easy manner of filling the inner tube with air and the inner tube inflated with air makes a very good and pliable cushion for the collar. By providing a filler of solid form at the lower end of each section of the collar and at the upper end thereof the collar is made very strong and durable, particularly at the bottom where most collars break, and inasmuch as the two sections are in effect hinged at their lower ends, the liability of breakage at this point is materially eliminated.

I claim:—

1. A horse collar having an outer casing of flexible fabric and slit for a portion of its length, and an inner inflatable tube insertible through said slit into the casing, the margins of the slit having clincher beads, and a rim of stiff material having clincher beads with which the clincher beads on the casing are adapted to engage, and means extending through said rim whereby the inner tube may be inflated.

2. A horse collar having an outer casing of flexible fabric, the upper and lower ends of the casing having solid cores, the casing on each side of the collar being formed to provide a chamber intermediate the cores, the outer wall of each chamber being slit, an inflatable inner tube adapted to be removed through said slit and disposed within each chamber, the margins of each slit being formed with clincher beads, rims, one for each slit, having means to engage the clincher beads, and means for inflating said inner tubes extending through the rims.

3. A horse collar split at its upper end to provide two laterally disposed neck engaging portions, a neck-piece disposed between said portions and including an upwardly bowed leaf spring, padding disposed on the inner face of said leaf spring and extending upward around the edges thereof, a plurality of cross bars operatively engaged with the spring and with the padding and each formed at its ends to partly embrace the collar, and a plurality of outwardly projecting pins carried by the neck-piece the upper ends of the two portions of the collar being provided with a plurality of longitudinally extending series of perforations through which said pins are adapted to engage.

In testimony whereof I hereunto affix my signature.

HERMAN H. RUEDEBUSCH.